Figure 1:
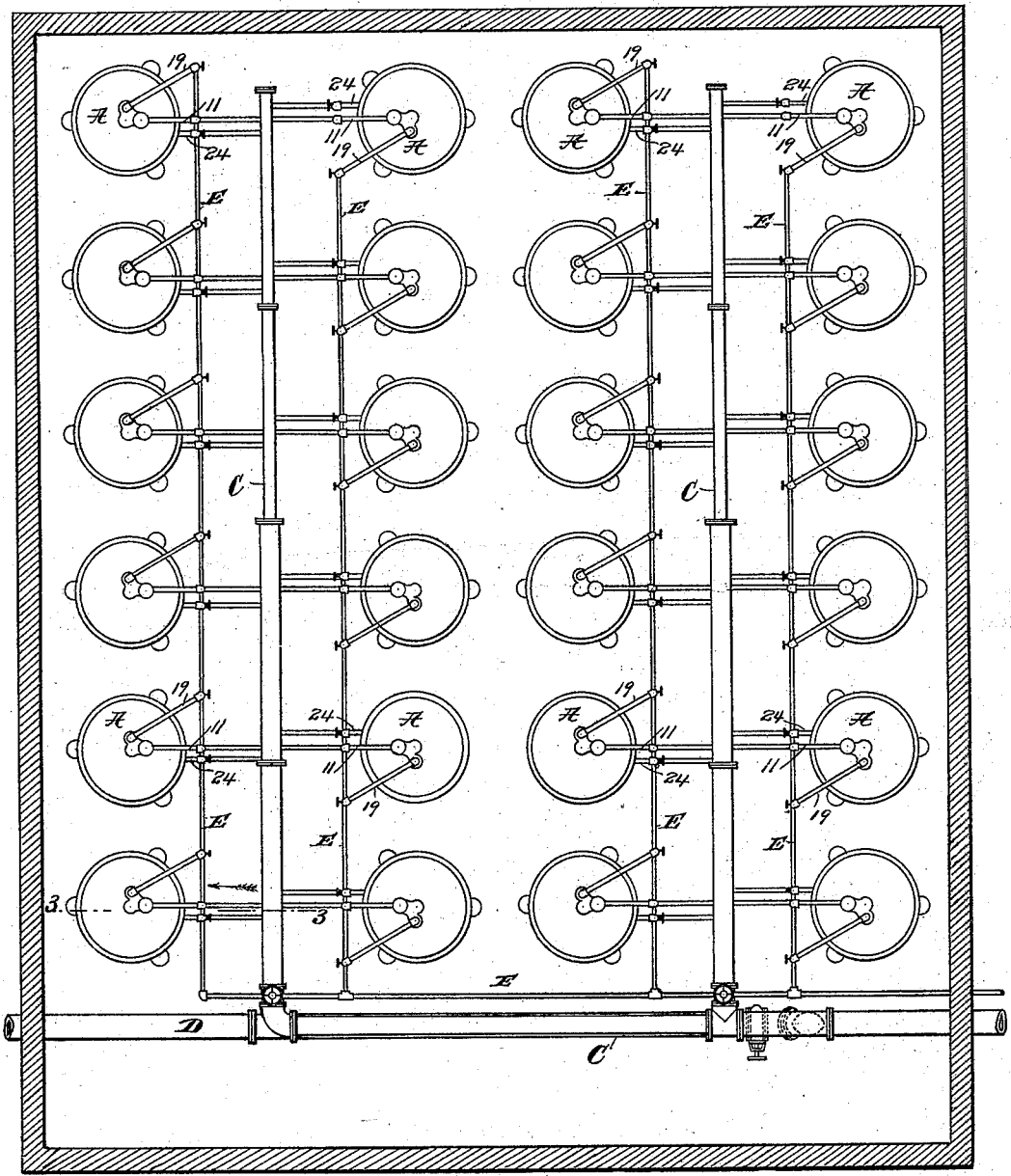
Figure 1:
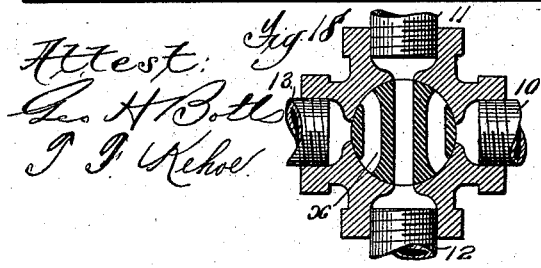

(No Model.)  C. C. WORTHINGTON.  5 Sheets—Sheet 1.
FILTER.

No. 550,706.  Patented Dec. 3, 1895.

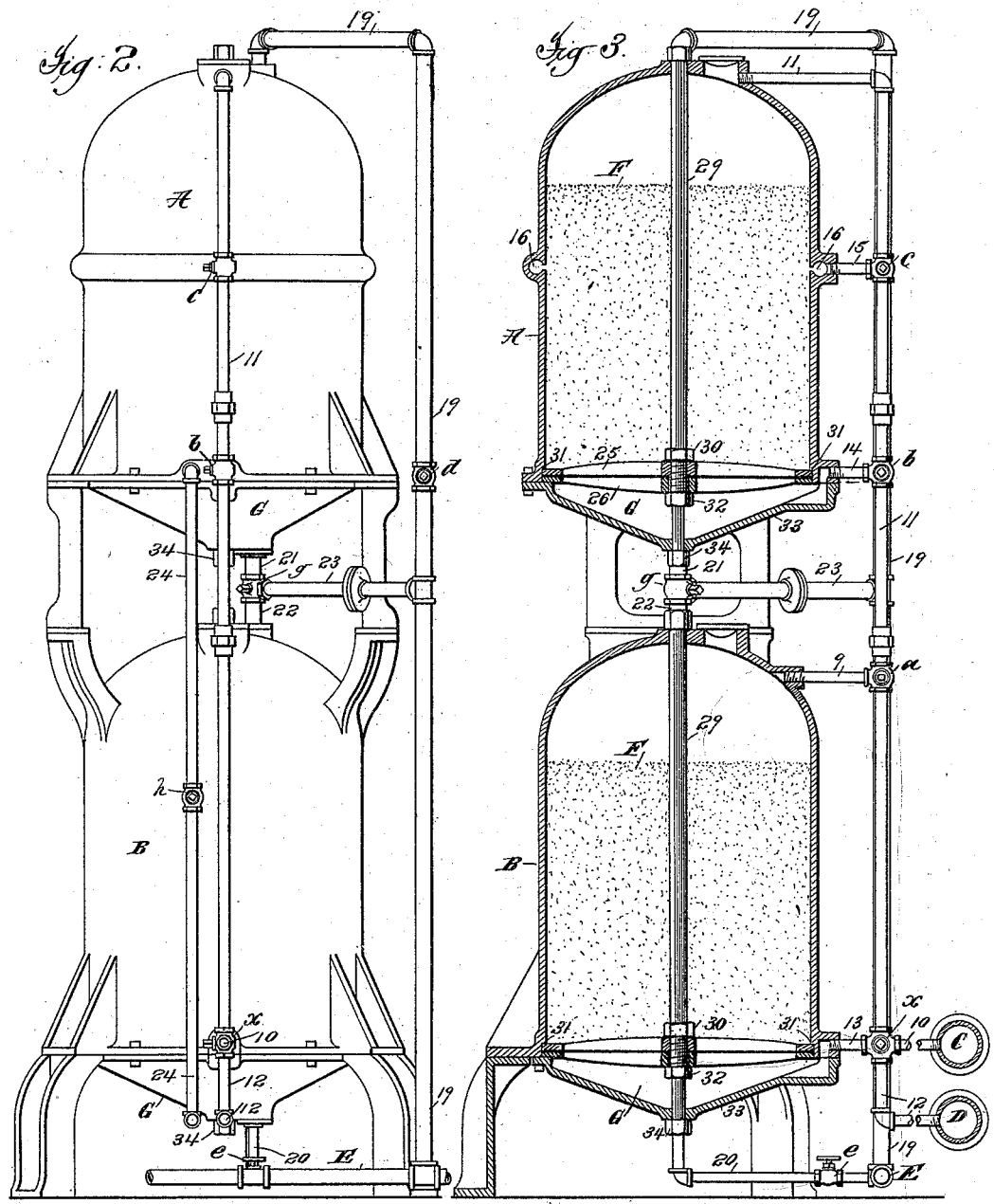

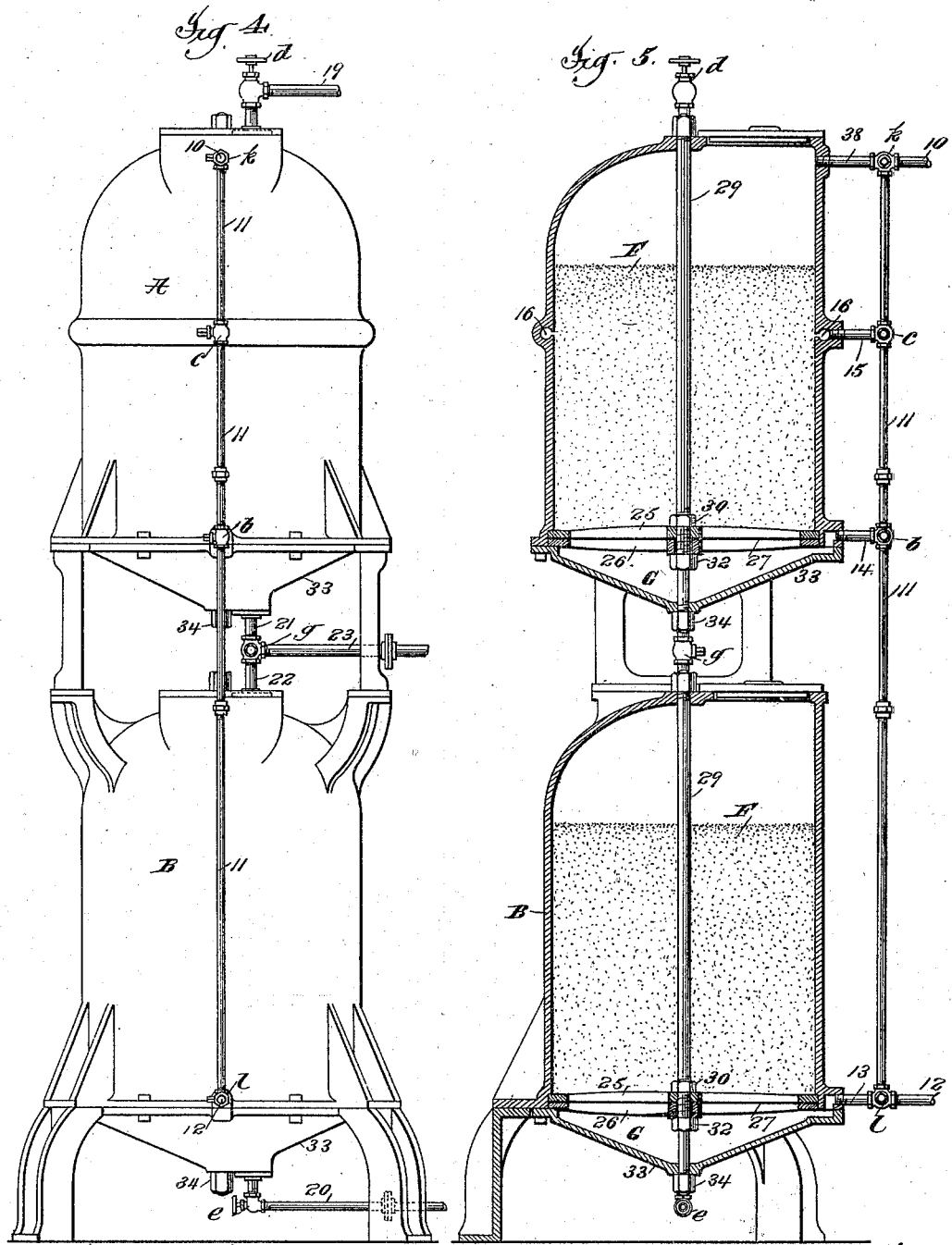

(No Model.) 5 Sheets—Sheet 4.
C. C. WORTHINGTON.
FILTER.
No. 550,706. Patented Dec. 3, 1895.
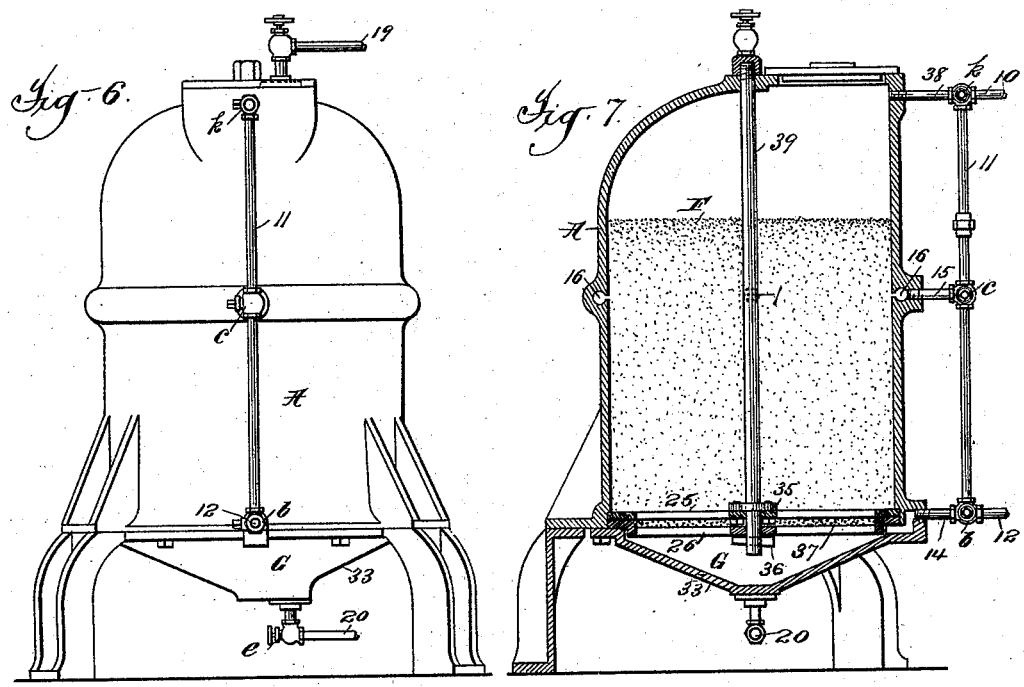
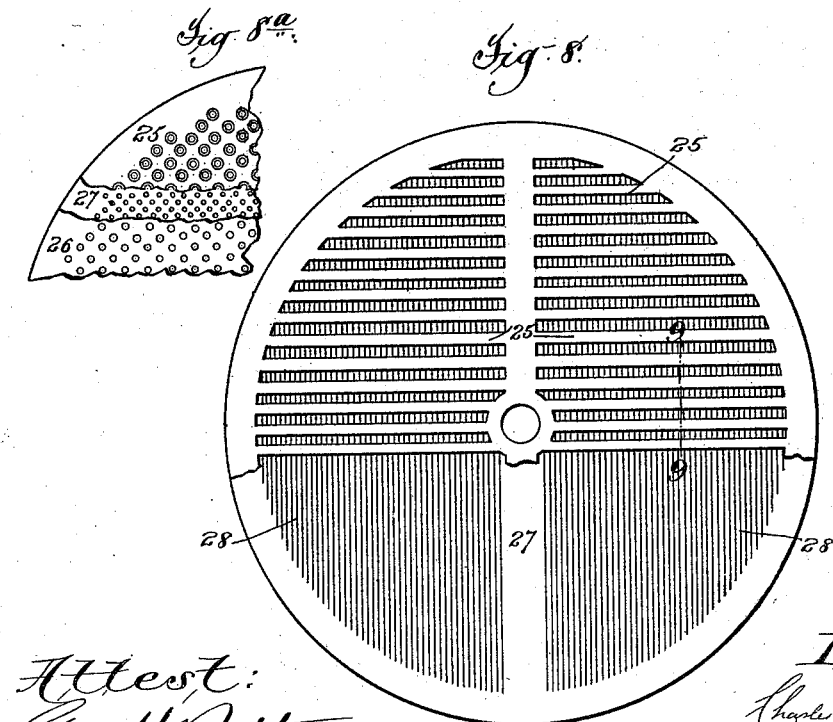
Attest:
Geo. H. Bott
I. F. Kehoe
Inventor
Charles C. Worthington
by Philipp, Dunmore & Phelps
Attys
ANDREW B.GRAHAM. PHOTO-LITHO.WASHINGTON.D.C.

(No Model.) 5 Sheets—Sheet 5.
C. C. WORTHINGTON.
FILTER.
No. 550,706. Patented Dec. 3, 1895.
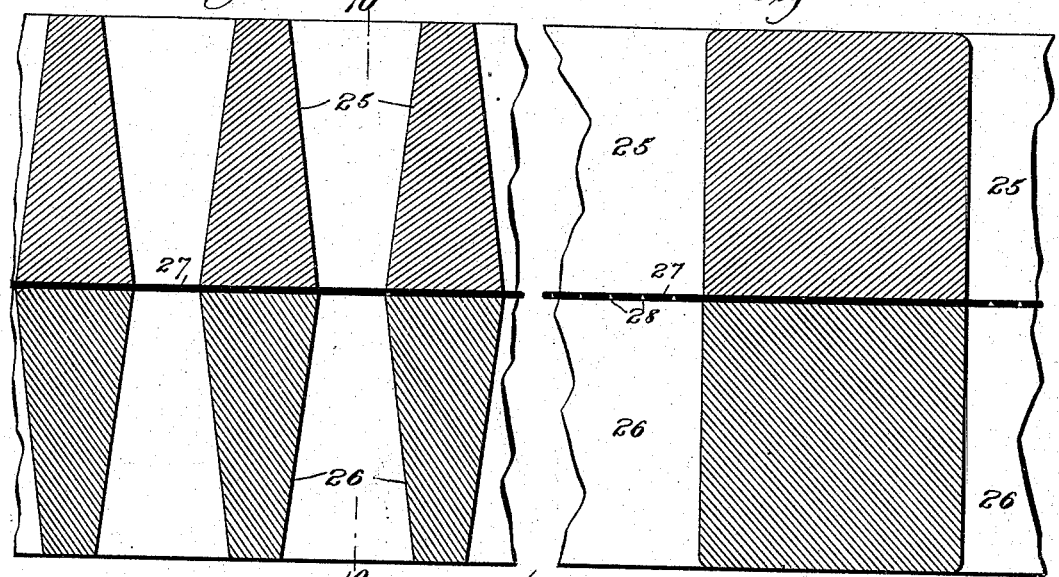
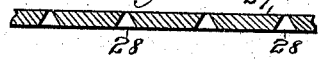
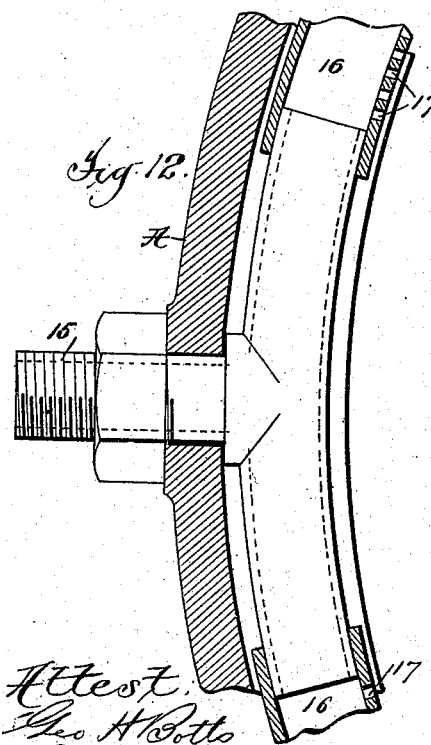
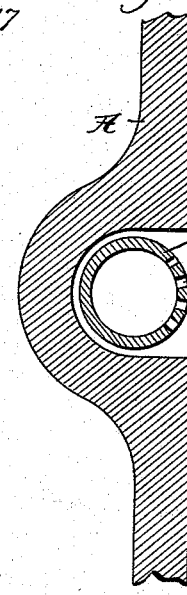
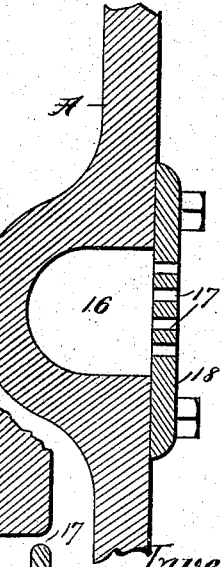

UNITED STATES PATENT OFFICE.

CHARLES C. WORTHINGTON, OF IRVINGTON, NEW YORK.

FILTER.

SPECIFICATION forming part of Letters Patent No. 550,706, dated December 3, 1895.

Application filed February 9, 1892. Serial No. 420,885. (No model.)

*To all whom it may concern:*

Be it known that I, CHARLES C. WORTHINGTON, a citizen of the United States, residing at Irvington, county of Westchester, and State of New York, have invented certain new and useful Improvements in Filters, fully described and represented in the following specification and the accompanying drawings, forming a part of the same.

The object of the present invention is to improve the general construction and arrangement of filter plants and systems and the detail construction of the filters themselves, and especially to provide a practical filter plant composed of a large number of comparatively small filters.

It is necessary to wash the bed and thoroughly cleanse all parts of filters more or less frequently, depending upon the size of the filter used and the character of the liquid filtered. It is necessary, also, that the support of the sand or other filtering media should be such as to allow the filtered water to pass through and at the same time prevent the passage of the sand, while exposing a large surface of the sand to the current on reversing the latter for washing, so that the filter-bed may be raised bodily and worked over by the washing-current, a current or currents simply passing through the bed having been found insufficient to thoroughly wash it.

The support in common use consists of a series of small strainer-pipes below the sand, either separately set in cement or secured in a plate which is thus set. Between the pipes and the sand a layer of large gravel is used, which prevents to a certain extent the passage of the sand into the pipes. It is found in practice, however, that this gravel is not sufficient for the purpose, but that the pipes in time become clogged with a sediment of sand and impurities, and it is necessary to remove them to cleanse them. Access to these strainer-pipes has been provided from the top of the filter only, so that when clogged they can be reached for cleansing only by removing the entire filter-bed of sand and the bed of cement in which they are set, involving an expense almost equal to the cost of the filter. The time required for this operation and the difficulties existing in washing and cleansing filters as previously constructed have resulted in the use of filter plants consisting of a few large filters, so that a large amount of filtration might be accomplished between successive washings and cleansings. Such filter plants are objectionable, chiefly on the following grounds:

In systems in which a pumping-engine supplies a town through a few large filters the available capacity of the engine must be largely in excess of that required by the town in order to meet the demands of the cleansing process. The size of each filter is such that the cutting out of one of the filters for the purpose of washing decreases largely the filtering capacity of the plant, and the washing of such large filters consumes a considerable amount of time. To maintain the desired capacity of a filter plant at all times, therefore, it is necessary that the number of filters should be in excess of the desired capacity of the plant, and this increases largely the cost of filter plants. These difficulties in washing and cleansing, moreover, result in infrequent washings of the filter-bed, and the bed and strainer become clogged to such an extent that a very high water-pressure on the engine is required to force the water through them, and the high pressure thus produced in the filter necessitates a very strong and expensive construction of the filters used and interferes with the proper filtration of the water.

I provide an improved construction of filter-base by which the permanent clogging of the outlets is prevented and cleansing rendered easy, as the part containing the outlets is readily accessible for purpose of cleansing and may be removed without removing or interfering with the filter-bed. By my construction, also, I am able to readily and conveniently remove the filter-strainer bodily from the base of the filter for the purpose of changing it. I provide, also, an improved arrangement by which any one or more of the filters may readily be cut out and washed without interfering with the filtering operation of the other filters and by which the draft of water required for washing at any one time is greatly reduced. I thus render the use of small filters practicable, as the work of cleansing the outlets and washing the bed is so slight that it may readily be done as often as desired.

I am thus enabled, also, to construct the filters of cheaper material and at less expense, as less strength is required in the construction of the filter when the filter-bed is kept clear and when the diameters are reduced.

My invention includes, also, an improved construction for washing the top of the filter-bed. It is well known that the top of the filter-bed requires more frequent and thorough washings than other parts, as the impurities collect therein much more rapidly. This washing has previously been done by perforated pipes extending through the upper part of the filter-bed, a common construction consisting of a central pipe having laterally-extending arms. Such constructions have been found objectionable, as the bodily raising of the sand during washing tends to break the pipes. I avoid this objection by locating the pipe or pipes for washing the filter-bed substantially out of the line of movement of the bed, so that the body is left free to be raised and worked over by the washing-current.

I provide, also, an improved construction and arrangement of two filters, by which double filtration may be effected, or one or both the filters readily cut out, or both used simultaneously for single filtration. In my improved construction in its preferred form, moreover, the two filters may be washed simultaneously or successively and by separate currents.

The invention consists in these various improvements and in other improvements in details of filter construction, all of which will be particularly described in the following specification and pointed out in the claims.

In the accompanying drawings, forming a part of this specification, and in which the improvements forming my invention are shown in their preferred form, Figure 1 is a plan view of my improved filter plant. Fig. 2 is an elevation of a single pair of filters, looking in the direction of the arrow in Fig. 1. Fig. 3 is a vertical section of the same on the line 3 3 of Fig. 1. Figs. 4 and 5 are views similar to Figs. 2 and 3, showing a modified arrangement of pipes. Figs. 6 and 7 are views corresponding to Figs. 4 and 5, showing a single filter and modified construction of strainer and support and a modification of the means for washing the top of the filter-bed. Fig. 8 is a detail plan of the preferred form of strainer and support on an enlarged scale, a part of the upper grid being broken away. Fig. 8ª is a similar broken view of a perforated strainer and support. Fig. 9 is a detail section on line 9 9 of Fig. 8. Fig. 10 is a section on line 10 10 of Fig. 9. Fig. 11 is a detail section of a part of the strainer. Figs. 12 and 13 are detail sections of the pipe for washing the top of the filter-bed. Figs. 14 and 15 show modifications of the same. Figs. 16 to 20 are detail sections of the controlling-cocks, which will be hereinafter referred to.

Referring now especially to the construction shown in Figs. 1 to 3, the filters forming the plant of Fig. 1 are arranged in pairs, the filter A of each pair being mounted above the filter B, and the pairs of filters being preferably arranged, as shown, in series on opposite sides of a supply-pipe C and delivery-pipe D, branches of which extend the length of the rows of filters, the waste-pipe E being provided with branches extending parallel with the branches of the supply and delivery pipes.

The filters of the plant are preferably of the construction shown in Figs. 2 and 3 and are provided with the usual filtering-beds F, of sand or other suitable filtering media, and with the chambers G, formed in their bases, to which the water passes from the bed through the strainer and support, which will presently be described in detail, this chamber being preferably made concave, as shown, so that any foreign material passing through the strainer may collect in the lower reduced part of the chamber and be more readily withdrawn, while the filtered water is allowed to pass to the outlet above such material.

The top filter A is the first filter of the pair during double filtration, and the main supply-pipe C communicates with the top of the filter through the horizontal pipe 10 and vertical pipe 11, the latter entering the top of the filter. The pipe 11 communicates, also, with the outlet-pipe 13, which enters the chamber G of the lower filter B and communicates with the delivery-pipe D through pipe 12, the four pipes 10, 11, 12, and 13 having a common valve-box and communication being controlled by means of a four-way cock $x$, which is arranged to connect pipe 10 with pipe 11 and pipe 13 with pipe 12 during the process of filtration, as shown in Fig. 16; to close pipes 11 and 12 and connect pipes 10 and 13 during the process of washing with unfiltered water, as shown in Fig. 17; to connect pipes 12 and 13 or 12 and 11 when washing with filtered water, as shown in Figs. 16 and 18, or to cut the filters out by closing pipe 10, as shown in Fig. 18. The pipe 11 communicates, also, by means of pipe 9, controlled by three-way cock $a$, with the top of filter B, by pipe 14, controlled by three-way cock $b$, with the base-chamber G of the upper filter A, and by pipe 15, controlled by a similar cock $c$, with the pipe 16, surrounding the upper part of the filter-bed of filter A and provided with perforations or one or more narrow slots 17, through which the water is forced into the upper part of the filter-bed for washing it. This pipe 16 is preferably formed of an independent pipe placed in a recess cast therefor in the wall of the filter, as shown in Figs. 12 and 13; but the construction may be varied widely.

In Fig. 14 I have shown a construction in which the recess in the filter-wall forms the pipe and the perforations or slots 17 are in a plate 18, secured over and closing the inner opening of the recess. As shown in Fig. 15, the construction is the same, except that the slot is formed between the edge of the plate 18 and the wall of the recess, the plate being made adjustable by nut and slot, as shown, so that the size of the washing-jet may be varied.

The pipe by which the upper part of the filter-bed is washed is thus placed out of the line of movement of the filter-bed in washing, so that the body of the bed is free to be raised and worked over without danger of injury to the pipes. The recess is shown as cast so as to lie on the outer side of the filter-wall, and this is the preferred construction, as the pipe thus offers the least resistance to the movement of the filter-bed; but it will be understood that the recess may be upon the inside of the filter-wall, if preferred, or the pipe may be otherwise secured at the edge of the bed out of the line of its movement. Various other constructions, moreover, may readily be devised having the same function. In connection with this outside pipe I employ a pipe 39, extending centrally through the filter-bed from base to top and connected to the supply-pipe or base-chamber, as shown in Fig. 7, this pipe being perforated at 1, so as to form jets. The top of the bed is thus washed by jets from the center and outside, both pipes being placed out of the line of movement of the bed, so that the bodily movement of the bed does not affect them.

The filters communicate with the waste-pipe E as follows: A pipe 19 enters the top of the filter A and extends outward and then downward directly to one of the branches of the waste-pipe and is controlled by a cock $d$, and a pipe 20 connects the chamber G of filter B with the same branch and is controlled by a cock $e$. The two filters are connected by vertical pipes 21 22, communicating to form a connection extending from the bottom of the filter A to the top of filter B and connected at their junction with the vertical portion of the pipe 19 by pipe 23, communication through the pipes 21, 22, and 23 being controlled by a three-way cock $g$. Pipe 24 connects the chamber G of the upper filter A with the delivery-pipe D and is controlled by cock $h$, the filtered water passing through this pipe when the upper filter is used in single filtration.

Referring now to the parts forming my improved construction of filter-base, 25 26 are two grids, of any suitable metal, these grids consisting, preferably, of bars placed a short distance apart to form slots and extending substantially across the body of the grid, so that but a small surface is opposed to the passage of the water in filtering and washing. The openings in the upper and lower grids are preferably tapered in opposite directions, as shown in Fig. 9, the openings in the upper grid contracting downward, so as to pack the gravel and sand and support it independently of the strainer, and the openings in the lower grid expanding downward, so as to allow the free passage of any foreign material passing the strainer. Between these two grids is held the strainer, which consists, preferably, of a brass or copper plate 27, which is provided with a series of slots 28, extending at right angles to the slots formed by the grid-bars, as shown in Fig. 8, these slots being of the width required for straining and preferably expanding from top to bottom, as shown in Fig. 11, so that any foreign material passing into the slots will readily pass through and into the chamber G, preventing choking of the strainer.

The openings in the grids and strainer may consist of perforations instead of slots, as in the construction shown in Fig. 8$^a$, these perforations being tapered in the same manner as the slots.

The grids and strainer are preferably partially supported by a central vertical rod 29, extending through the filter, the upper grid 25 being shown in Fig. 3 as screwed upon this rod and held in the proper position against a nut 30 on the rod 29 and shoulders 31, formed in the wall of the filter. The strainer 27 and lower grid 26 are then passed over the rod from below and all the parts securely locked together by a nut 32 upon the rod below grid 26. For the purpose of affording access to these parts and permitting them to be literally removed and replaced the concave base-plate 33, which forms the chamber G at the base of the filter, is made removable and preferably is supported upon the rod 29 by a nut 34, the plate being supported, also, by bolting to a flange on the filter. The base-plate 33 partially supports the strainer and grid, and it is evident that the parts may be entirely supported by the base-plate; but the central support is desirable on account of the weight of the filter-bed.

It is evident that the strainer and grids may be supported on the rod by other means than those described. A simple construction is shown in Fig. 7, in which the upper grid is bolted to a flange 35 and the lower grid and strainer secured by a key 36. The upper grid may be supported by a key or otherwise and the lower supported only at the edge.

While I have shown a construction in which the strainer may be removed for cleansing, the construction by which the strainer is rendered readily accessible by the removal of a part of the filter-shell forms a part of my invention independently of the feature of a removable strainer. With an accessible strainer, especially in combination with the upper grid, forming a support for the filter-bed, a sufficient cleansing may in some cases be secured from below without removing the strainer.

The concave base-plate 33, forming the chamber G at the base of each filter, forms an important feature of my construction. By the use of this concave chamber and the drain-pipe at its central and lowest point all the foreign material passing the strainer collects within a small confined space in the chamber, and the filtered water passes readily above it to the outlet-pipe, and the foreign material is readily removed through the drain-pipe when the cocks are opened.

While I prefer to use the strainer described, other forms may be employed with my removable grids. Thus I have shown in Fig. 7 a construction in which the lower grid 26 is so constructed as to form a shallow chamber between the grids, and the strainer consists of a body of gravel 37, of suitable size, this gravel being placed in the chamber in the lower grid before the introduction of the latter and removed with it when the strainer is to be cleansed or changed.

The operation of the construction described is as follows: In the process of double filtration the water to be filtered is admitted through the main supply-pipe C and branches extending throughout the filter plant. The four-way cocks $x$ are in the position shown in Fig. 16. The cocks $a$ $b$ $c$ are set to cut-out pipes 9 14 15. Pipes 21 and 22 are connected by cocks $g$, and the waste and drain pipes 19 20 are closed by cocks $d$ $e$. The water passes from the supply-pipe C through pipes 10 and 11 to the upper filters A and through the filter-beds and strainers to upper chambers G. The filtered water then passes directly through pipes 21 22 to the lower filters B, and thence, after the second filtration, through the lower chambers G and pipes 13 12 to the main delivery-pipes D.

When only a single filtration is desired, the upper filter A is used, the filtered water being conveyed to the delivery-pipe D through pipe 24. In this process of single filtration the cock $g$ will be turned so as to close pipe 21 and the cock $h$ of the pipe 24 will be opened, all the other cocks remaining in the same position as in double filtration.

When single filtration in both filters simultaneously is desired, the adjustment is the same, except that cocks $a$ are turned so as to connect pipes 9 with pipes 11 and throw in the filters B, which deliver to pipe D, as in double filtration. It is evident that the capacity of the plant may thus be doubled, which is of great advantage in certain cases.

In the construction shown in Figs. 2 and 3 and now being described the filters of each pair are washed successively and by either unfiltered or filtered water.

When the upper filter of any pair is to be washed, the four-way cock $x$ being in the position shown in Fig. 16 and the adjustment being that for double filtration, the three-way cock $b$ is first turned so as to close the pipe 11 above it and open the pipe 14 to chamber G of filter A, and the three-way cock $g$ is turned so as to close the pipe 22 and connect the pipes 21 23. The water then passes from the supply-pipe C through pipes 10, 11, and 14 to the chamber G and this is thoroughly washed, the water passing thence through the pipes 21 23 to the waste-pipe 19. The chamber G having been washed, the cock $g$ is turned so as to close the pipe 21 and the cock $b$ is turned so as to open pipe 11 above and below it and at the same time connect pipe 14 therewith. The cock $c$ is then turned so as to connect pipe 15 and pipe 11 below the cock, but to close pipe 11 above the cock $c$, and the cock $d$ on waste-pipe 19 is opened. The water being admitted through pipes 10, 11, 14, and 15, the filter-bed is washed by the water from the pipe 16 acting upon the upper part of the filter-bed and the water from pipe 14 passing through the grids and strainer and the body of the bed, the washings passing from the top of the filter A through the pipe 19.

It may be found preferable to wash the upper part of the bed first, and this part may require washing more frequently than the lower part. By turning cock $b$ so as to close pipe 14 the full current will pass through pipes 15 and 16 and only the upper part be washed.

The upper filter having been washed, the cock $g$ is turned so as to close the pipe 21 and connect pipe 22 with the waste-pipe 19 through pipe 23. The four-way cock $x$ is turned from the position shown in Fig. 16 to that shown in Fig. 17, so as to close pipes 11 and 12 and connect pipes 10 and 13, the water from the supply-pipe thus passing directly into the chamber G of the lower filter. The cock $e$ in drain-pipe 20 is first opened and the chamber G thoroughly washed, as previously described in connection with the upper filter, and then the cock $e$ is closed and the water forced through the strainer and filter-bed, the washings passing to the waste-pipe 19 through pipes 22 23.

Both filters having been washed, the cocks are returned to their original position for double or single filtration, as desired.

If it be desired to wash the filters with filtered water from the delivery-pipe D, the adjustment is the same, except that for washing the upper filter A the four-way cock $x$ is turned into the position shown in Fig. 18, so as to connect pipes 12 and 11, and for washing lower filter B is turned into the position shown in Fig. 16, so as to connect pipes 12 and 13.

When the strainer of a filter is to be removed for cleansing, the nut 34 and base-piece 33 are first removed from the rod 29, and then, on the removal of the nut 32, the lower grid 26 and strainer 27 may readily be slipped down over rod 29 and removed from the filter without interfering with the filter-bed, which is still supported by the upper grid 25, screwed upon the rod 29. After the strainer is cleansed the parts are returned to position and secured by nuts 32 34, as before. In the construction shown in Fig. 7 the grid and strainer are removed by removing the base-piece 33 and key 36 and then slipping off the lower grid and strainer, as before. It will be seen that this provides a convenient means for the cleansing of the strainer without removing any of the permanent parts of the filter or interfering with the filter-bed. The process of removal is simple and consumes but a short time, thus permitting the use of small filters with frequent cleansing of the strainers, the time lost in cleansing being inconsiderable.

When it is desired to remove the filter-bed for renewal or any other purpose, the upper grid 25 may readily be removed from the rod 29, after the removal of the lower grid and strainer, by unscrewing it, as in the construction shown in Fig. 3, or unbolting it from flange 35, as shown in Fig. 7, and the filter-bed may be renewed readily after the grid is replaced by filling through the manhole provided at the top of the filter, as usual.

It will be seen that filter B, with its connections with supply and delivery pipes C D and pipes 9 and 23, connecting it with pipe 11 and waste-pipe 19, forms a complete single-filter construction, and that by the use of the four-way cock $x$ a construction is provided in which the filter may readily be cut out or washed with filtered or unfiltered water. This single-filter construction forms a part of my invention.

When it is desired to throw any of the filters out of commission, it is necessary only to turn the four-way cocks $x$ into the position shown in Fig. 18, and it is evident that the whole plant may thus be quickly thrown out in case of fire or other emergency.

In Figs. 4 and 5 I have shown a system of double filtration in which both filters may be washed simultaneously by separate currents. In this construction the inlet-pipe 10 from supply-pipe C enters the top of the filter A through a short pipe 38, and the head of the vertical pipe 11 connects with the pipes 10 38 by means of a three-way cock $k$. The foot of the vertical pipe 11 connects by means of a three-way cock $l$ with the pipes 13 12, conveying the filtered water from the chamber G of the filter B to the delivery-pipe D. The other connections are the same as shown in Figs. 2 and 3, if a construction enabling both filters to be used simultaneously for single filtration be desired. If, however, the lower filter is not to be used for single filtration, the pipes 9 and 24 are not required and a construction in which the two filters may be used for single filtration separately but not simultaneously is secured without pipe 24. With this construction the cocks $k$ $l$ are turned during filtration so as to close the vertical pipe 11 at both ends and to complete the connections between the filters and the supply and delivery pipes, the cock $l$ being in the position shown in Fig. 19, the water then passing directly through pipe 38 to the top of filter A and through the two filters and pipes 13 12 to the delivery-pipe. When the filters are to be washed, the cock $k$ is turned so as to close the pipe 38 and connect pipes 10 and 11 and the cock $l$ is turned so as to connect pipes 11 and 13 and close pipe 12, as shown in Fig. 20, the cock $d$ for the waste-pipe 19 is opened, and the cock $g$ turned so as to close the pipe 21 and connect pipes 22 23. If the top of the bed in filter A is not to be washed separately, the cocks $b$ $c$ will be turned so as to open pipe 11 throughout its length and connect pipes 14 15 therewith. The upper filter A is then washed by currents from pipes 14 15, the washings passing through the waste-pipe 19, and the lower filter is washed by the current from the pipe 13, the washings passing through pipes 22 23 to the waste-pipe 19. If it be desired to wash the upper part of bed A separately, the cock $c$ will be turned so as to close pipe 11 below the cock.

If it be desired to wash each filter separately, the upper filter A may be washed by turning the cock $b$ so as to close pipe 11 below the cock and connect pipes 11 and 14, the other cocks remaining the same as in washing both filters. When the lower filter is to be washed, cocks $b$ $c$ will be turned so as to close pipes 14 15 and to open pipe 11 throughout its length, and the entire supply from pipe 10 will pass through pipe 13 to the lower filter, and thence through pipes 22 23 to the waste-pipe 19. When the upper filter A in this construction is to be used alone, the cock $g$ will be turned so as to close pipe 21 and the cock $l$ so as to close the pipe 13 and connect pipes 11 and 12. The water will then pass from the upper filter through pipe 14 and vertical pipe 11 to pipe 12, and thence to the delivery-pipe D.

In Figs. 6 and 7 I have shown certain modifications of my improvements in filter construction applied to a single filter. The strainer is shown as formed of gravel 37, supported by the lower grid 26, and the perforated pipe 39 is substituted for the rod 29, this pipe communicating with chamber G, and the grids and strainer being supported by the base-plate 33 and by flange 35 on the pipe, to which the upper grid is bolted, and key 36 below the lower grid, all as previously described. In this construction the piping and arrangement of parts are substantially the same as in the construction shown in Figs. 4 and 5, except that the lower filter is omitted and outlet-pipe 12 connects directly with pipe 14 through cock $b$. The processes of filtration and of washing are performed in the same manner as already described in connection with filter A in Fig. 5, the washing of the top of the bed being performed partially by pipe 39, filled from chamber G.

My construction provides a very efficient and complete filter plant in which the cutting out of the filters or washing of the filter-beds by filtered or unfiltered water is secured by a simple and convenient arrangement of piping and in which the process of cleansing the strainers is greatly facilitated by their accessibility and the ease with which they may be removed. The processes of filtration and washing are readily carried on simultaneously in different filters, and the comparatively small size of the filters enables the current to be reversed through one or more for washing without necessitating an appreciable increase in power over that required for filtration. My construction, moreover, provides a very efficient system of double filtration in which either one or both of the filters may readily be used for single filtration.

What I claim is—

1. The combination with first and second filters A, B, of pipes connecting said filters for double filtration, pipes connecting each of said filters with the waste pipe, pipe 11 communicating with the supply and with the inlet of the first filter and the outlets of both filters, suitable valves controlling communication through said pipes for filtering or washing, pipe 24 forming an outlet for the first filter during single filtration, a valve controlling said pipe, pipe 9 communicating with pipe 11 and forming an inlet for the second filter during single filtration and a valve controlling said pipe, substantially as described.

2. The combination with first and second filters A, B, of pipes connecting said filters for double filtration, pipes connecting each of said filters with the waste pipe, pipe 11 communicating with the inlet and outlet of the first filter, suitable valves for controlling communication through said pipes, pipes 10, 12 and 13 communicating respectively with the supply, delivery and the outlet of the second filter, and four way cock $x$ controlling communication through said pipes and pipe 11, substantially as described.

3. The combination with filters A, B, of pipes 21, 22, connecting said filters for double filtration, pipe 23 communicating with said pipes and with the waste pipe, valve $g$ opening communication through said pipes 21, 22, or connecting either of said pipes with the waste pipe, pipe 11 communicating with the supply and with the inlet of filter A, and the outlets of both filters, and suitable valves for controlling communication through said pipes for filtering or washing, substantially as described.

4. The combination with filters A, B, of pipes 21, 22 connecting said filters for double filtration, pipe 23 communicating with said pipes and with the waste pipe, valve $g$ opening communication through said pipes 21, 22, or connecting either of said pipes with pipe 23, pipe 11 communicating with the supply and with the inlet of filter A, and the outlets of both filters, suitable valves for controlling communication through pipe 11 for filtering or washing, pipe 24 forming an outlet for the filter A, during single filtration, and a valve controlling said pipe, substantially as described.

5. The combination with filters A, B, of pipes 21, 22 connecting said filters for double filtration, pipe 23 communicating with said pipes and with the waste pipe, valve $g$ opening communication through said pipes 21, 22, or connecting either of said pipes with pipe 23, pipe 11 communicating with the supply and with the inlet of filter A, and the outlets of both filters, suitable valves for controlling communication through pipe 11 for filtering or washing, pipe 24 forming an outlet for the filter A, during single filtration, a valve for controlling said pipe, pipe 9 communicating with pipe 11 and forming an inlet for filter B during single filtration, and a valve controlling said pipe, substantially as described.

6. The combination with a vertical filter bed, of washing connections with the bottom of the bed, whereby vertical movement of the bed is caused during washing, a washing pipe surrounding the upper part of the bed and formed in or carried by the wall of the filter, whereby said washing pipe and connections are out of the line of washing movement of the bed, and a washing pipe extending through the bed parallel with the line of washing movement, substantially as described.

7. The combination with filter A having a body of filtering material F, of a support for the bed permitting the passage of water, a base chamber G outside said support forming the outlet chamber during filtering and inlet chamber during washing, and washing pipe 39 extending through the bed parallel with the washing movement of the bed and communicating with chamber G and supported outside the bed, substantially as described.

8. The combination with a filter bed, of a support for the bed, and a removable strainer outside said support, substantially as described.

9. The combination with a filter bed, of a support for the bed, a removable strainer outside said support, and a removable support for said strainer, substantially as described.

10. The combination with a filter bed, of a removable support for the bed, and a removable strainer outside said support, substantially as described.

11. The combination with a filter bed, of a removable support for the bed, a removable strainer outside said support, and a removable support for said strainer, substantially as described.

12. The combination with a filter bed, of a removable base plate, a removable support for the bed, and a removable strainer outside said support, substantially as described.

13. The combination with a filter bed, of a removable support for the bed, a strainer outside the support and the central rod 29 forming a support for said support and strainer, substantially as described.

14. The combination with the central rod 29, of a removable support for the bed supported by said rod, a strainer outside said support, and a removable base plate forming a chamber ouside the strainer, substantially as described.

15. In a filter, the combination of a grid forming the support for the bed and a removable grid supporting a removable strainer outside said supporting grid, substantially as described.

16. The combination with the removable base plate, of a removable grid forming the support for the bed, a removable strainer outside of said grid, and a removable grid outside the strainer, substantially as described.

17. The combination with grid 25 forming the support for the bed and having openings contracting outward, of a strainer, and grid 26 outside said strainer, substantially as described.

18. The combination with grid 25 forming the support for the bed and having openings contracting outward, of a strainer, and grid 26 outside said strainer having openings expanding outward, substantially as described.

19. The combination with grid 25 forming the support for the bed and having openings contracting outward, of a strainer 27 outside said grid consisting of a metal plate provided with suitable openings, and grid 26 outside said strainer, substantially as described.

20. The combination with grid 25 forming the support for the bed and having openings contracting outward, of strainer 27 consisting of a metal plate outside said grid and having openings expanding outward, and grid 26 outside said strainer, substantially as described.

21. The combination with grid 25 forming the support for the bed and having openings contracting outward, of strainer 27 consisting of a metal plate outside said grid provided with suitable openings, and grid 26 outside said strainer, the openings in said strainer and grid 26 expanding outward, substantially as described.

22. The combination with grid 25 forming the support for the bed and having openings contracting outward, of grid 26 outside said grid 25 and having openings expanding outward, and a strainer between said grids, substantially as described.

In testimony whereof I have hereunto set my hand in the presence of two subscribing witnesses.

CHARLES C. WORTHINGTON.

Witnesses:
A. J. CALDWELL,
H. W. TILLINGHAST.